(12) United States Patent
Augustine et al.

(10) Patent No.: US 11,449,470 B2
(45) Date of Patent: Sep. 20, 2022

(54) PATCHING JSON DOCUMENTS THAT CONTAIN ARRAYS UNDERGOING CONCURRENT MODIFICATION

(71) Applicant: TIBCO Software Inc., Palo Alto, CA (US)

(72) Inventors: Joshy Mannacherry Augustine, Swindon (GB); Simon Alexander Morgan, Swindon (GB); Howard Spencer Phillips, Swindon (GB)

(73) Assignee: TIBCO Software Inc., Palo Alto, CA (US)

( * ) Notice: Subject to any disclaimer, the term of this patent is extended or adjusted under 35 U.S.C. 154(b) by 352 days.

(21) Appl. No.: 15/994,686

(22) Filed: May 31, 2018

(65) Prior Publication Data
US 2018/0349405 A1 Dec. 6, 2018

Related U.S. Application Data

(60) Provisional application No. 62/514,662, filed on Jun. 2, 2017.

(51) Int. Cl.
| | |
|---|---|
| *G06F 16/00* | (2019.01) |
| *G06F 16/176* | (2019.01) |
| *G06F 16/93* | (2019.01) |
| *G06F 16/178* | (2019.01) |

(52) U.S. Cl.
CPC ...... *G06F 16/1767* (2019.01); *G06F 16/1787* (2019.01); *G06F 16/93* (2019.01)

(58) Field of Classification Search
CPC .............. G06F 16/2365; G06F 16/273; G06F 16/1767; G06F 16/1787; G06F 16/93
See application file for complete search history.

(56) References Cited

U.S. PATENT DOCUMENTS

| | | | | |
|---|---|---|---|---|
| 9,367,570 | B1* | 6/2016 | Csillag | G06F 16/21 |
| 10,552,443 | B1* | 2/2020 | Wu | G06F 16/2246 |
| 2012/0265742 | A1* | 10/2012 | Burckhardt | G06F 16/27 707/694 |
| 2016/0239658 | A1* | 8/2016 | Loughlin-McHugh | G06F 21/45 |

OTHER PUBLICATIONS

Bryan et al., RFC 6902—JavaScript Object Notation (JSON) Patch, 2013, Internet Engineering Task Force. (Year: 2013).*
Cao et al., "JSON Patch for Turning a Pull Restful API into a Push", 2016, Springer. (Year: 2016).*
Silberstein et al., "PNUTS in Flight: Web-Scale Data Serving at Yahoo", 2012, IEEE. (Year: 2012).*

* cited by examiner

*Primary Examiner* — Ajith Jacob
(74) *Attorney, Agent, or Firm* — McGuireWoods LLP

(57) ABSTRACT

In various aspects, a method, system and computer program product provides for concurrent changes to data of a document or a file by a plurality of users at a plurality of user devices. The documents or file may be rendered in JavaScript™ Object Notation (JSON) format. The documents may be patched or changed by employing new functional operations for applying metadata for elements of the arrays associated with the document or file, and to merge changes from made among the various users. The disclosure provides for maintaining and producing new versions of the document or the file, the changes controlled so that data of the arrays are merged atomically and the updates do not fail permitting simultaneous changes to the document or file by multiple users.

24 Claims, 3 Drawing Sheets

PATCHING JSON DOCUMENTS THAT CONTAIN ARRAYS UNDERGOING CONCURRENT MODIFICATION

CROSS-REFERENCE TO RELATED APPLICATIONS

This application claims priority and benefit of U.S. Provisional Application No. 62/514,662 filed on Jun. 2, 2017, entitled PATCHINIG JSON DOCUMENTS THAT CONTAIN ARRAYS UNDERGOING CONCURRENT MODIFICATION, the disclosure of which is incorporated by reference herein in its entirety.

BACKGROUND

Field of the Invention

The invention relates generally to information processing technology and, more specifically, to a system, method and computer program product that generally provides enabling synchronous changes to stored data, permitting multiple users to concurrently revise or modify a common document rendered in electronic format, among other aspects.

Related Art

In a computer system environment, concurrent access for making changes to documents or files by multiple users can be problematic. For example, access by multiple users intending to make modifications to a document or a file that is maintained in a database may be prevented during the time period that a first user is already in the midst of making a change, effectively blocking changes to the document by the multiple users at that point in time.

In some instances, a user may attempt to make changes to a document that has been recently changed, but that particular user's version may not be the current version depending on access timing. Therefore, additional changes may result in an inaccurate or out-of-date document or file.

Moreover, documents may be rendered in a particular format and ordered in a particular manner. Changes to the ordering of a document by a user may also lead to inaccurate updates to the document or file as other users attempt to make changes without having the latest version, possibly leading to incorrect changes in data due to incorrect reference to portions of a document that has been reordered.

SUMMARY OF THE DISCLOSURE

In aspects, the system, computer program product and method of the present disclosure allow multiple end users to make changes synchronously or concurrently to a data stored in a format that may need to be updated asynchronously in a storage repository.

In one aspect, a computer-implemented method for concurrent changes to data of a document or a file by a plurality of users at a plurality of user devices is provided. The computer-implemented method comprising tagging at a computer at least one document or at least one file to create metadata for elements of at least one array containing data associated with the at least one document or the at least one file, the tagging specifying a rank and an ID for each tagged element to identify positions within the array; changing at a computer values of data of the at least one array or changing order of objects in the at least one array; diffing at a computer two tagged documents or files to produce at least one Changes List, the at least one Changes List specifying changes made to the at least one document or the at least one file; and creating at a computer a new version of the at least one document of file by a merge operation that processes the Changes Lists to create a new version of the at least one document or the at least one file so that changes to the data are merged atomically so that synchronous charges by the plurality of users is applied asynchronously in order, thereby permitting the plurality of users to make changes to the document or the file concurrently in time. The format of the data or file may be JavaScript™ Object Notation (JSON) format.

In one aspect, a computer program product for facilitating concurrent changes to data of a document or a file by a plurality of users at a plurality of user devices wherein the computer program product comprises computer instructions embodied on a computer readable medium not being a transitory propagating signal encoding computer-readable instructions, the computer program product when read and executed by at least one computer performing the following steps: tagging at the at least one computer at least one document or at least one file to create metadata for elements of at least one array containing data associated with the at least one document or the at least one file, the tagging specifying a rank and an ID for each tagged element to identify positions within the array; changing the at least one computer, values of data of the at least one array or changing order of objects in the at least one array; diffing at the at least one computer two tagged documents or files to produce at least one Changes List, the at least one Changes List specifying changes made to the at least one document or the at least one file; and creating at the at least one computer a new version of the at least one document of file by a merge operation that processes the Changes Lists to create a new version of the at least one document or the at least one file so that changes to the data are merged atomically so that synchronous charges by the plurality of users is applied asynchronously in order, thereby permitting the plurality of users to make changes to the document or the file concurrently in time.

BRIEF DESCRIPTION OF THE DRAWINGS

The accompanying drawings, which are included to provide a further understanding of the invention, are incorporated in and constitute a part of this specification, illustrate aspects of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE DISCLOSURE

Figure 1:
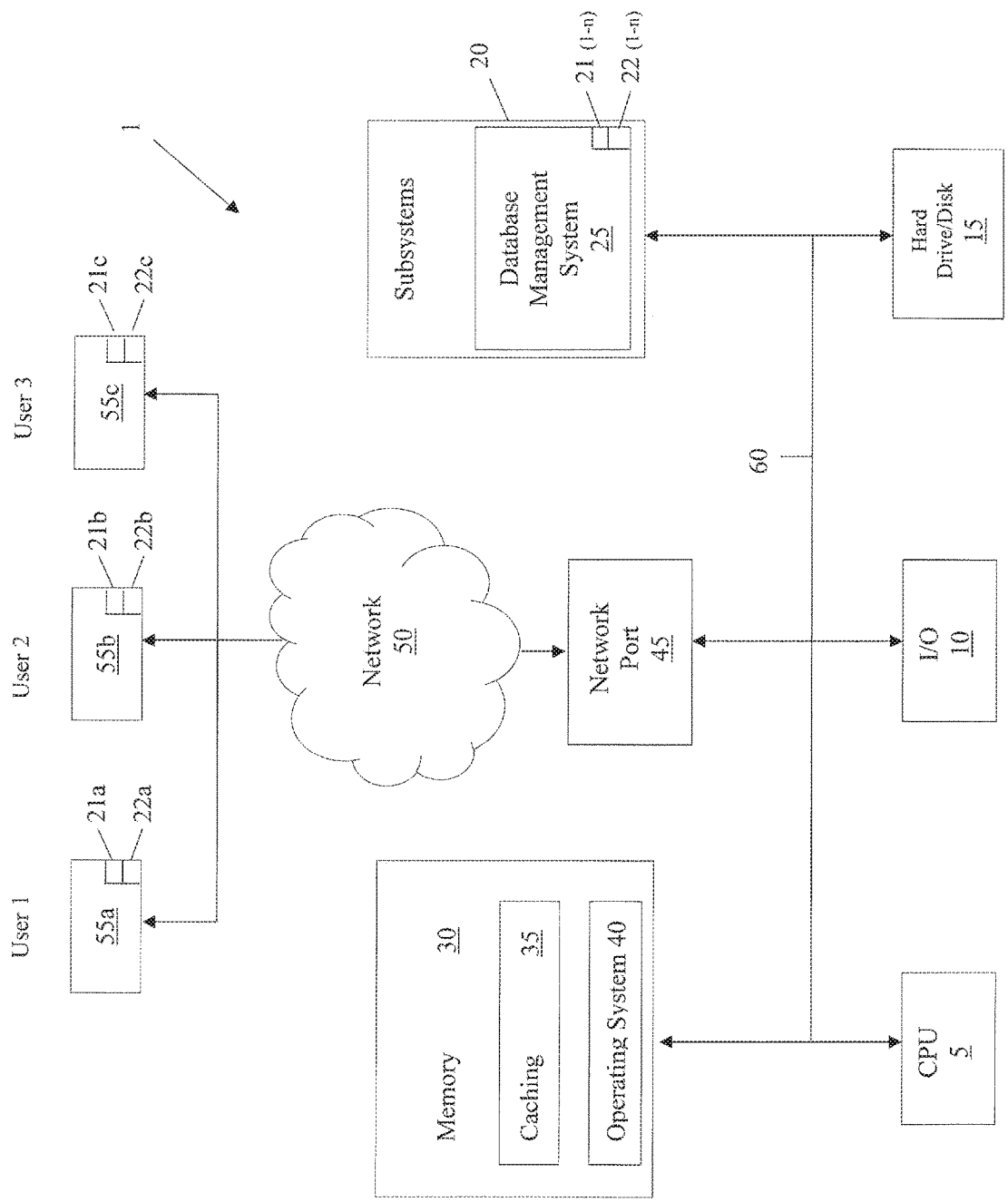
FIG. 1 is a generalized illustration of an example information handling system that can be used to implement the system and method of the present disclosure.

The various aspects of the disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the various examples of the invention. The examples used herein are intended merely to facilitate an understanding of ways in which the invention may be practiced and to further enable those of skill in the art to practice the various aspects of the invention. Accordingly, the examples herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular examples only, and is not intended to limit the scope of the invention, unless specifically stated otherwise. It must be noted that as used herein and in the appended claims, the singular forms "a," "an," and "the" include plural reference unless the context clearly dictates otherwise.

A "computer", also referred to as a "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, cell phone, notebook computers, desktop computers, workstation computers, servers, or the like. Further, the computer may include an electronic device configured to communicate over a communication link. The electronic device may include, for example, but is not limited to, a mobile telephone, a personal data assistant (PDA), a mobile computer, a stationary computer, a smart phone, mobile station, user equipment, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "network," as used in this disclosure, means an arrangement of two or more communication links. A network may include, for example, a public network, a cellular network, the Internet, a local area network (LAN), a wide area network (WAN), a metropolitan area network (MAN), a personal area network (PAN), a campus area network, a corporate area network, a global area network (GAN), a broadband area network (BAN), any combination of the foregoing, or the like. The network may be configured to communicate data via a wireless and/or a wired communication medium. The network may include any one or more of the following topologies, including, for example, a point-to-point topology, a bus topology, a linear bus topology, a distributed bus topology, a star topology, an extended star topology, a distributed star topology, a ring topology, a mesh topology, a tree topology, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, or the like.

The terms "including", "comprising" and variations thereof, as used in this disclosure, mean "including, but not limited to", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer except is not a transitory propagating signal encoding computer-readable instructions. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other non-transitory storage medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G, 4G or 5G cellular standards, Bluetooth, or the like.

Users of an information handling system may access and modify or change data in a stored document or other format such as a JavaScript Object Notation (JSON) document. Situations may arise to allow multiple users to concurrently work on a JSON document or data stored in another data format. In practice, the users may make the changes to the document synchronously in time; however the actual data update, e.g., to the JSON document, may need to happen asynchronously. In aspects, the system, computer program product and method of the present disclosure allow multiple end users to make changes synchronously to a data stored in a format that may need to be updated asynchronously in a storage repository.

In embodiments, a "json merge" solution as described herein satisfies one or more of the following concurrency requirements:
1. Whenever needed, end-users, or system processes, may work on the same data at the same time.
2. Data updates from the multiple users are merge atomically.
3. Data updates do not fail.
4. In certain conflict situations, a "last one wins" approach is followed. For example, when multiple users update exactly the same JSON attribute.

FIG. 1 is a generalized illustration of an example information handling system 1 that can be used to implement the system and method of the present disclosure. Other configurations are possible such as, e.g., a client-server, peer-to-peer, distributed processing or other architectures as is commonly known in the art. The information handling system 1 includes at least one processor 5 (e.g., central processor or "CPU", which may function as a server), at least one input/output (I/O) device 10, such as, e.g., a keyboard, a mouse, voice input/output, touch screen, and at least one storage device such as a hard drive 15. In embodiments, information handling system 1 may also include network port 45 operable to connect with network 50. Network 50 may be a wired or a wireless type of network, or a combination of different networks. Information handling system 1 includes system memory 30 which may be interconnected to the foregoing via one or more buses 60. Other subsystems 20 such as a database, as part of a database management system 25, may be operably coupled to the at least one processor 5 via bus 60. System memory 30 may include cache 35 and further comprise operating system (OS) 40. Information handling system 1 includes a plurality of user devices 55a-55c operatively coupled to a communication link such as network 50 for interaction with operating system 40 and subsystems 20. Each of the user devices 55a-55c may comprise a computerized device such as a personal computer or equivalent device. Information handling system 1 facilitates, at least in part, the "json merge" solution. At least one document 21 (or documents 100, 101, 108, 114, 121, 127, 131 of FIG. 2) may be conveyed to the user devices 55a-55c so that a version of the document 21a-21c is present at respective user devices 55a-55c for independent access and changing by a user, which may be either synchronous access or asynchronous access. A separate Changes List 22a-22c may be caused to be created by each user at user devices 55a-55c which may be sent to the CPU 5 for processing, represented generally as Changes List 22.

JSON Patch

The Internet Engineering Task force (IETF) Request for Comments 6902 (ISSN: 2070-1721 April 2013), JSON Patch specification, defines a JSON document structure for expressing a sequence of operations to apply to a JavaScript Object Notation (JSON) document, which is suitable for use with the HTTP PATCH method. JSON Patch specification also details how to create a JSON Patch that describes:

Adding an array element (Appendix A.2)
Moving an array element (Appendix A.7)
Removing an array element (Appendix A.4)
Updating an array element value (Appendix A.5)

In order to perform the above, JSON Patch identities an array element by its position in an array. For example, "/foo/0" identifies "bar" in the JSON object {"foo": ["bar", "baz"]}

JSON Patch for removing "bar" from this JSON Object will be

[{"op": "remove", "path": "/foo/0"}]

However, if array elements in "foo" was re-ordered (For example, to {"foo": ["baz", "bar"]}) before JSON Patch was applied, it will result in removing "baz" rather than "bar" element.

JSON Merge Patch

The Internet Engineering Task force (IETF) Request for Comments 7386 (ISSN: 2070-1721 October 2014), JSON Merge Patch specification, details changes to be made to a target JSON document using a syntax that closely mimics the document being modified. Per this specification, it is not possible to patch part of a target that is not an object, such as to modify or replace just some of the values in an array.

Characteristics in JSON Patching in Various Embodiments

Over and above patch capabilities mentioned in the above-referenced JSON Patch specification(s), the following capabilities are provided in various embodiments, according to principles of this present disclosure:

A. Concurrent Modification of JSON Arrays

In various embodiments, a new JSON Patch technique as disclosed herein enables arrays in a target JSON (or other asynchronously updated) document to be concurrently modified (e.g., array elements re-ordered, array elements removed, or array elements added) by two or more users. In such scenarios, JSON Patching as disclosed herein still correctly identifies and applies a "patch" onto exactly the same array element as the creator of the patch intended.

B. Better Support for Re-Ordering of Array Elements

JSON Patch specification (noted above), in Appendix A.7, details how an array element can be moved.

For example, the following JSON patch describes moving array element "grass" from second position(JSON Path used zero based) to fourth position.

[{"op": "move", "from": "/foo/1", "path": "/foo/3"}]

This is expected to result in target document to change from

{"foo": ["all", "grass", "cows", "eat"]} to

{"foo": ["all", "cows", "eat", "grass"]}

However, if a new element was added in second position in the target document meanwhile, {"foo": ["all", "healthy", "grass", "cows", "eat"]} then, applying JSON patch will result in unintended array element being moved

{"foo": ["all", "grass", "cows", "healthy", "eat"]}

C. Support Patching of Simple and Complex Arrays

JSON patching solution supports patching simple (For example, "foo" in the following example:

{"foo": ["bar", "baz"]} as well as complex (For example, "orderLines" in the following example

```
{
  "orderIdentifier": 123,
  "state": "CANCELLED",
  "customerName": "Graham Devine",
  "orderLines": [{
    "partNum": "Doobrey1",
    "unitPrice": 10.99
  }, {
    "partNum": "Thingy9",
    "unitPrice": 249.99
  }]
}
```

In various embodiments, an interface with three operations is declared: Tag, Diff and Merge, which all consume or produce valid JSON documents.

A. Tag

Any valid JSON data can be transformed using a tagging mechanism invoked using the taggedJonDocument=tag(jsonDocument) operation, yielding a JSON document containing additional metadata introduced by the tagging of arrays.

B. Diff

The diff operation will compare two previously tagged JSON documents and return as a result a JSON array of differences: the Changes List 22.

jsonChanges=diff(taggedJsonDocument, taggedJsonDocumenutModifiedByUser)

C. Merge

The merge operation will take a tagged JSON document and apply changes created by a previous diff result, creating an updated version of the document.

updatedTaggedJsonDocument=merge(recentlyModifiedDocument[1], jsonChanges)

Due to concurrency, the taggedJsonDocumentModifiedByUser (which is that user's view of the state of the document), may be different to recentlyModifiedDocument when another user has merged changes beforehand.

A strong feature of the merging mechanism is that it is forgiving when creating the updatedTaggedJsonDocument. This is made possible by the metadata containing:

i) a rank to express a positional preference and ii) a unique id to precisely pinpoint JSON values, (especially in the case that element order has changed in the window between a user starting to modify a document and the change being committed by the merge).

Figure 2:
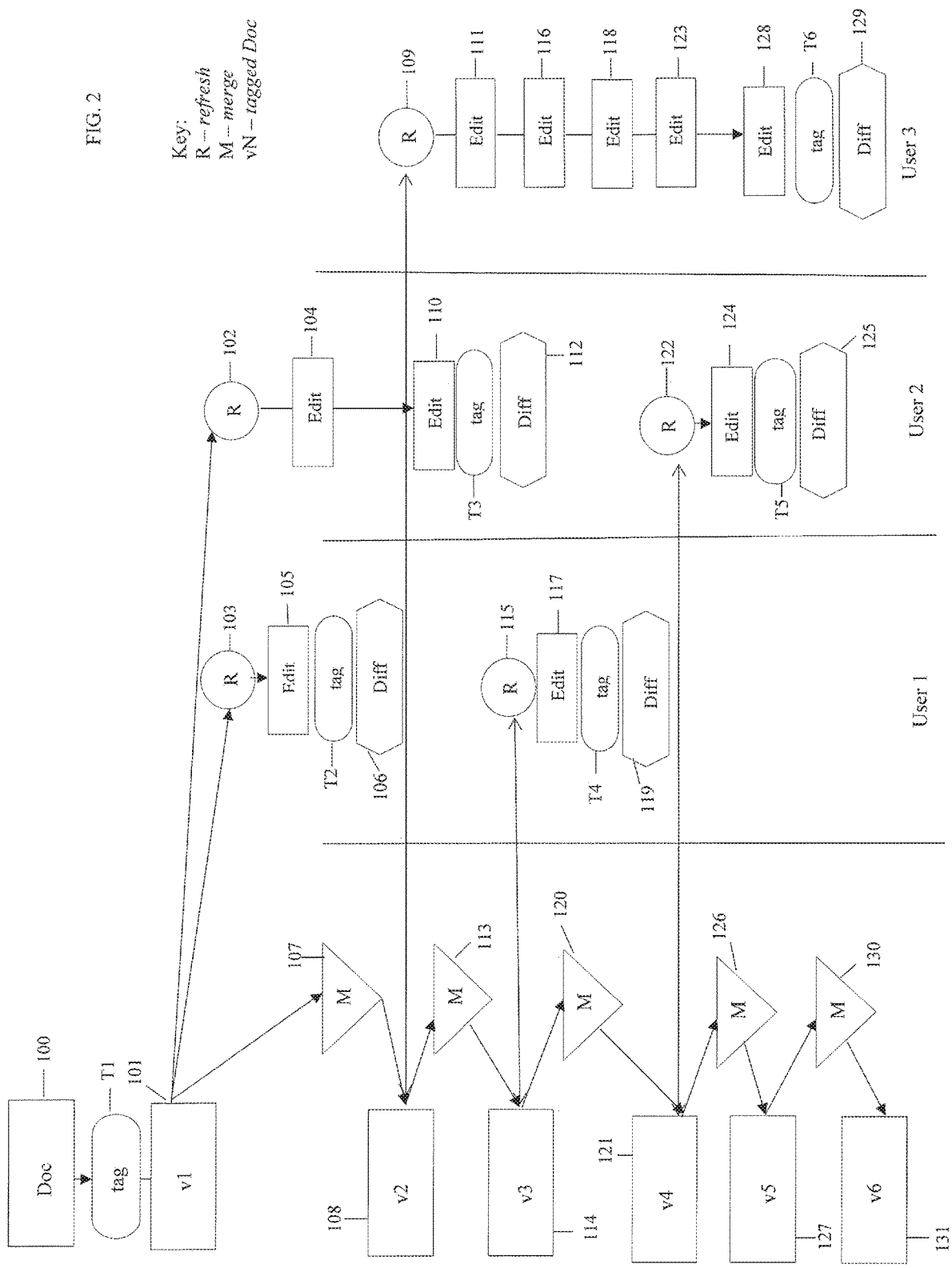
FIG. 2 is an example functional flow diagram of a process involving various users concurrently updating a document, the steps performed according to principles of the disclosure.

FIG. 2 is an example functional flow diagram of a process involving various users (User 1, User 2, User 3) concurrently updating a document 21, the steps performed according to principles of the disclosure. The flow diagram of FIG. 2 (and also FIG. 3) may also represent a block diagram of those computer instruction components that when combined with appropriate computer processing platform performs the respective steps thereof. The flow diagram of FIG. 2 (and also FIG. 3) may also represent computer instruction components that may be embodied on a computer-readable medium to create a computer program product comprising the computer instructions components that when read and executed by a computer, perform the respective steps of the processes.

FIG. 2 is organized to show a time sequence and activity involving concurrent edits to a common document 21 by three users. In FIG. 2, an initial untagged document 100 is first tagged T1 creating version 1 document 101 and this is given to two users, User 1 at device 55a and User 2 at device 55b, in response to them refreshing 102,103. Refresh, tag, diff and merge operations may be managed and provided by operating system 40 using a database via database management system 25 where the various versions of the document being commonly edited may be maintained.

Both users, User 1 and User 2, edit the document concurrently 104, 105 but User 1 commits first causing a diff 106 and merge 107 to occur which produces a new version 2 document 108. A tag operation T2 may also be performed.

User 3 refreshes 109 and gets a copy of version 2 document 108. Meanwhile User 2 continues to edit 110 his version 1 copy and User 3 starts editing 111 a version 2 copy.

User 2 commits his changes causing diff 112 and merge 113 which produces a new version 3 document 114. A tag operation T3 may also be performed.

User 1 refreshes 115 and obtains copy of the version 3 document. Meanwhile, User 3 continues to edit 116.

User 1 and User 3 are now both editing 117,118 around the same time, but User 1 commits causing a diff 119 and merge 120 to occur which produces a new version document 121. A tag operation T4 may also be performed.

User 2 refreshes 122 and gets a copy of version 4 document. Meanwhile User 3 continues to edit 123 and User 2 edits 124 his version copy.

User 2 commits his changes causing diff 125 and merge 126 which produces a new version 5 document 127. Meanwhile User 3 continues to edit 128. A tag operation T5 may also be performed.

Finally, User 3 commits his changes causing diff 129 and merge 130 which produces a new version 6 document 131. A tag operation T5 may also be performed.

In various embodiments, the process of FIG. 2 provides several advantages once a document has been tagged with metadata:

1. A remote client user, e.g., User 1 at device 55a, can make changes to a large document and only the changes need get transferred via a network 50 to the host, e.g., CPU 5 and database management system 25, rather than sending the whole document.

2. The client user and the host can maintain their own views of the document and rely upon the merging operation at the host to provide the source-of-truth for the document.
3. Multiple users can work on the same document concurrently, changing different parts and independently sending changes to the host.

The Changes List 22 created by the diff operation provides enough metadata for the merge operation to decide what to do, especially in the case of handling concurrent updates by more than one active user and resolving the merging of arrays. In some embodiments, this is achieved:
1. By specifying a set of operations in the Changes List to support arbitrary document change(s); and/or
2. By specifying additional metadata for array elements; and/or
3. By specifying an address composed of a path and a rank preference.

Data Addressing

In some embodiments, the processes as disclosed herein illustratively assumes that the document being edited is serialized as JSON and the addressing scheme is designed to uniquely reference any data in the JSON document.

In various embodiments, a solution as disclosed here may differ from a JSON Pointer (RFC 6901) in respect of array elements as follows:
1. Array elements are identified using the metadata introduced by the tagging mechanism.
2. Each array element is assigned a rank preference within the array, which initially reflects the natural sequence of the elements, e.g., where lower numbers are towards the beginning and higher numbers towards the end.
3. The rank value can be less or more than the number of elements currently in the array but it is used when merging elements to arbitrate and resolve the insert position.

Tagging

In various embodiments, during tagging wherever an array is encountered, such as ["bar", "baz"] within {"foo": ["bar", "baz"]} then the tag operation adds metadata to each element by transforming the simple array into an array of objects containing three key/value pairs, such as:

```
{
  "foo": [{
    "_id": 656814826216461,
    "_rank": 0,
    "_value": "bar"
  },
  {
    "_id": -152981727816466,
    "_rank": 1,
    "_value": "baz"
  }
  ]
}
```

The _id is generated randomly with sufficient entropy to avoid collisions. The _rank is allocated in sequence to identify the position within the array. The _value holds the original array element value in this case simple strings "bar" or "baz" but it practice the _value could be any JSON value, including a complex tree of JSON.

Tagging of complex type arrays preserves JSON document structure. However, tagging a JSON document with simple arrays may alter simple array structure. In various embodiments, this approach allows even simple type arrays (in addition to complex type arrays,) to be merged. However, if alteration of JSON document structure is not desired (for example, if someone were to use this approach to HTTP Patch an already-in-use JSON document), it is conceivable to modify this solution such that simple type array structure is not altered (at the cost of only overwriting rather than patching simple type arrays).

Diffing

In various embodiments, during the operation, the two tagged JSON documents (each of which can represent an arbitrarily wide and deep tree of JSON objects) are first flattened into a finite array of nodes without any loss of data. Each JSON tree is traversed (or "walked") in the traditional manner to provide a linear list. Thus identical trees produce identical lists.

First, the elements of each list are compared from top to bottom until a discrepancy is encountered: that position is marked as the 'start'. If no discrepancy is found then the associated trees are assumed to be identical and the operation is complete, returning an empty Changes List. Second, the elements of each list are compared from bottom upwards as far as the marker "start" until a discrepancy is encountered: that position is marked as the "end." Third, the list elements between the markers represent the range within the dataset that contains the actual significant changes that need to be converted to a Changes List 22.

The list elements between start and end are compared and a Changes List 22 is built containing one or more of the following four types of operations: Remove/Add/Replace and Move.

1) Remove

This operation instructs the merge to delete the tree of data identified by the given path Example

```
[
  { "op" : "remove" , "path" : "/foo/656814826216461/" }
]
```

2) Add

This operation instructs the merge to add the JSON value at the position identified by the given path and rank position. If the rank specified is higher than number of elements it will be positioned at the end. If the rank is negative, it indicates a preference for a position relative to the end. A rank of 0 means always insert at the beginning.

Example

```
[
  { "op" : "add" , "path" : "/foo/12345987654321/" , "rank" : 2 , "value" : { } },
  { "op" : "add" , "path" : "/foo/12345987654321/_id/" , "rank" : 0 , "value" : 12345987654321 },
  { "op" : "add" , "path" : "/foo/12345987654321/_rank/" , "rank" ; 1 , "value" : 2 },
  { "op" : "add" , "path" : "/foo/12345987654321/_value/" , "rank" : 2 , "value" : "eat" }
]
```

3) Replace

This operation deletes whatever data is associated with the path and adds a replacement at exactly the same rank position.

Example

```
[
    { "op" : "replace" , "path" : "/foo/12345987654321/_value/" ,
    "value" : "xyz" }
]
```

4) Move

This operation moves the tree of data is associated with the path and inserts at a new rank position. If the data is already at the given rank position, it will be a "no operation" (NOP)

Example

```
[
    { "op" : "move" , "path" : "/foo/12345987654321/" , "rank" : 1 },
    { "op" : "move" , "path" : "/foo/-152981727816466/" , "rank" :
    2 }
]
```

Merging

In various embodiments, during merging, the operations specified in the JSON Changes List 22 are applied strictly in sequence to the current JSON document. Processing of the Changes List 22 is atomic, but ignoring an individual operation does not invalidate the Changes List—see Special Cases below. Optionally, duplicate array element values may be removed depending on the implementation requirement. After changes are made, the document metadata is re-ranked to reflect the current natural order of JSON nodes, producing an Updated Tagged Document.

Special Cases

In general, the approach to merging Changes Lists is "last one wins" but in some scenarios operations can be ignored or optimized.

Update of Deleted Element

In practice, at some point User 1 may delete an element that User 2 is currently changing.

Assuming User 1's Changes List is merged first, the element will be deleted.

When User 2's Changes List is created by the "Diff" process, it will be unaware that the element has already been deleted and so will create a "Replace" operation (rather than an "Add"). When User 2's Changes List is merged, the replace operation will be ignored because the element does not exist.

No-Operation (NOP) Optimization During Move Operation

In the simplest case of an array with two elements where the order has be swapped, the Changes List contains two move operations:

```
[
    { "op" : "move" , "path" : "/-103125728933935/" , "rank" : 0 },
    { "op" : "move" , "path" : "/-885778997733921/" , "rank" : 1 }
]
```

However, when the merge completes the first operation, the move will have implicitly reordered the elements meaning that the second explicit move operation is redundant.

In this simple example, the element data associated with address "/-885778997733921/" will already be in a valid rank position as a result of the move for address "/-103125728933935/" and so the second move becomes a NOP.

Figure 3:
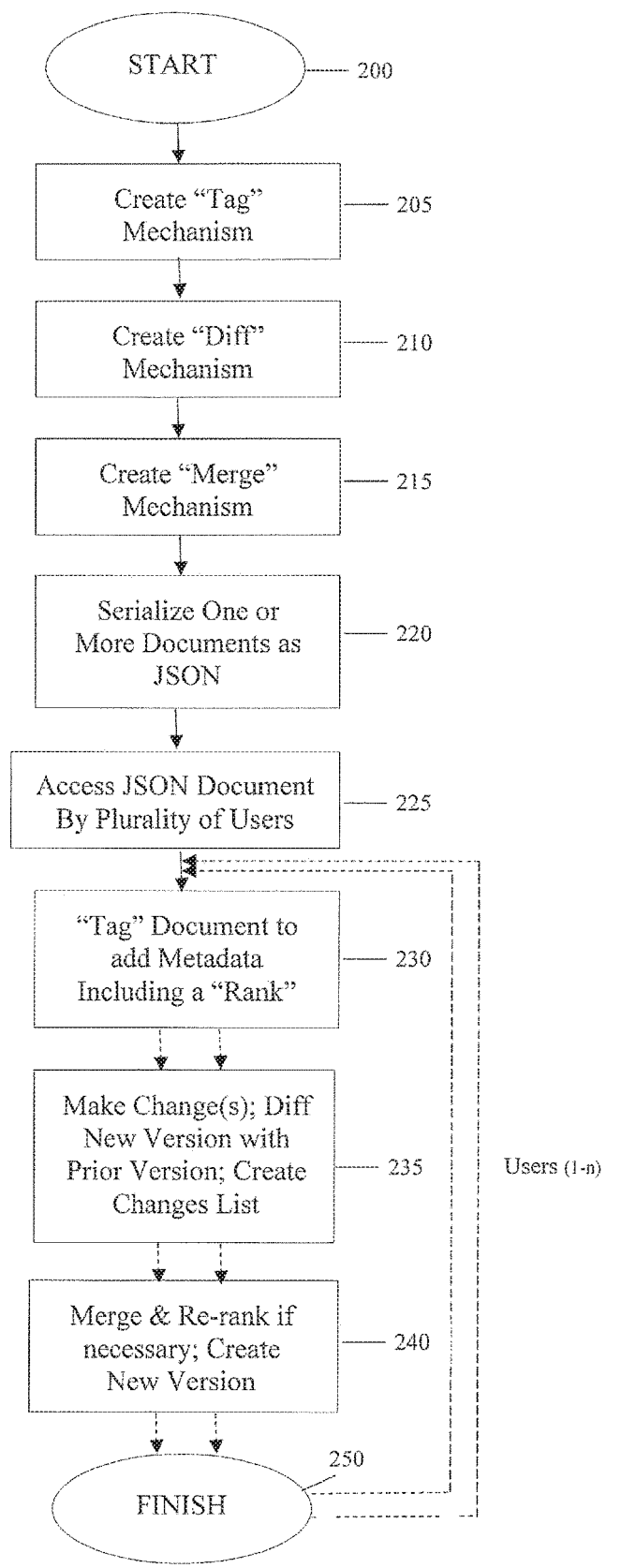
FIG. 3 is an example flow diagram of a process involving users concurrently updating a document, the steps performed according to principles of the disclosure.

FIG. 3 is an example flow diagram of a process involving users concurrently updating a document, the steps performed according to principles of the disclosure. The process may begin at step 200. The process is explained using JSON as the example format, but other formats could be employed that is capable of supporting or capable of being modified to support the following operations. At step 205, a "Tag" operation may be created that when invoked can transform data in a document or file to a new document or file with added metadata for elements of arrays representing the data including an ID and a rank for each element. At step 210, a "Diff" operation may be created that is configured to identify changes to two different versions of a tagged document or file and is configured to create a summary or a Changes List 22 that identifies data changed, modified, deleted or added by a user editing each document. The "Diff" operation creates the Changes List 22 which may contain one or more specified operations, namely, a "Remove" operation, an "Add" operation, a "Replace" operation and a "Move" operation as explained previously. The Changes List 22 may be created when a user commits to a new version or refresh.

At step 215, a "Merge" operation may be created that is configured to apply changes created by previous "Diff" operations, creating an updated version of the document or file, employing metadata applied by the "Tag" operation, and other aspects as explained previously. At step 220, a document or file may be serialized, if necessary, as a JSON document (or other format) so that concurrent access, changing and updating of the document or file by a plurality of different users may occur concurrently.

In steps 230, 235, 240 and 250 two paths are shown in broken lines which are meant to illustrate that a plurality of users may separately, but concurrently, make changes to a document or file, likely at different speeds. There may be multiple users involved represented by the notation "Users (1-n)." A particular user may "finish" at a different time from another user. At step 230 one or more users may "Tag" the document or file to add metadata to the data, as described previously. At step 235, one or more users may make changes to the document or file, and a "Diff" operation invoke that processes a prior version (which may have been modified by a different user previously) with the newly changed version to create a Changes List 22. At step 240 a "Merge" operation is initiated as described previously, and a new version of the document or file created, possibly with a re-ranking of elements of arrays. The process may continue for one or more users at step 230, or as a user completes their update session, then the particular user may finish at step 250.

While the invention has been described in this disclosure by way of illustrative examples, those skilled in the art will recognize that the invention can be practiced with modifications and in the spirit and scope of the appended claims.

We claim:

1. A computer-implemented method for concurrent changes to data of a document or a file by a plurality of users at a plurality of user devices, comprising:

tagging at a computer at least one document or at least one file to create metadata for elements of at least one array containing data associated with the at least one document or the at least one file, the tagging transforming the at least one array into an array of objects containing a plurality of key/value pairs for each tagged element, and the tagging specifying a rank and an ID for each tagged element to identify positions within the array;

changing at a computer values of data of the at least one array or changing order of objects in the at least one array;

diffing at a computer two tagged documents or files to produce at least one Changes List, the at least one Changes List specifying changes made to the at least one document or the at least one file; and creating at a computer a new version of the at least one document of file by a merge operation that processes the Changes Lists to create a new version of the at least one document or the at least one file so that changes to the data are merged atomically so that synchronous charges by the plurality of users is applied asynchronously in order, thereby permitting the plurality of users to make changes to the document or the file concurrently in time, wherein the Changes List contains an ADD instruction that instructs the merge operation to add a value at a position identified by a given path and a specified rank position.

2. The computer-implemented method of claim 1, wherein the format of the data or file is JavaScript Object Notation (JSON) format.

3. The computer-implemented method of claim 1, wherein in the diffing step, the produced at least one Changes List includes specifying one or more of the following operations:
  a REMOVE operation that instructs merge operation to delete data associated with the at least one document or the at least one file;
  an ADD operation that instructs the merge operation to add a value at a position in the at least one array;
  a REPLACE operation that instructs the merge operation to delete data at a specified location of the at least one array and to add a replacement data at the specified location; and
  a MOVE operation to move data of the at least one array at a specified location to a new location of the at least one array.

4. The computer-implemented method of claim 3, wherein the MOVE operation inserts a new rank position.

5. The computer-implemented method of claim 3, wherein the REPLACE operation maintains a same rank position for the replacement data.

6. The computer-implemented method of claim 3, wherein in the merge operation, in case of a conflict in data, the last change is used.

7. The computer-implemented method of claim 1, wherein the at least one Changes List specifies an address for an array element comprising a path and a rank.

8. The computer-implemented method of claim 1, wherein the plurality of user devices are in communication with a central processing unit across a network.

9. The computer-implemented method of claim 1, wherein the at least one Changes List comprising only those changes made at a particular user device to a version of the at least one document or the at least one file are sent to a central processing unit for the merge operation and creating of the new version.

10. The computer-implemented method of claim 1, wherein the at least one document or at least one file is a different version of the at least one document or the at least one file at least two of the plurality of user devices thereby permitting different changes to the document or the file by different users concurrently in time.

11. A computer program product for facilitating concurrent changes to data of a document or a file by a plurality of users at a plurality of user devices, the computer program product comprising computer instructions embodied on a computer readable medium not being a transitory propagating signal encoding the computer-readable instructions, the computer program product when read and executed by at least one computer performing the following steps:
  tagging at the at least one computer at least one document or at least one file to create metadata for elements of at least one array containing data associated with the at least one document or the at least one file, the tagging transforming the at least one array into an array of objects containing a plurality of key/value pairs for each tagged element, and the tagging specifying a rank and an ID for each tagged element to identify positions within the array;
  changing at the at least one computer, values of data of the at least one array or changing order of objects in the at least one array;
  diffing at the at least one computer two tagged documents or files to produce at least one Changes List, the at least one Changes List specifying changes made to the at least one document or the at least one file; and
  creating at the at least one computer a new version of the at least one document of file by a merge operation that processes the Changes Lists to create a new version of the at least one document or the at least one file so that changes to the data are merged atomically so that synchronous charges by the plurality of users is applied asynchronously in order, thereby permitting the plurality of users to make changes to the document or the file concurrently in time, wherein the Changes List contains an ADD instruction that instructs the merge operation to add a value at a position identified by a given path and rank position.

12. The computer program product of claim 11, wherein a format of the data or file is JavaScript Object Notation (JSON) format.

13. The computer program product of claim 11, wherein in the diffing step, the produced at least one Changes List includes specifying one or more of the following operations:
  a REMOVE operation that instructs merge operation to delete data associated with the at least one document or the at least one file;
  an ADD operation that instructs the merge operation to add a value at a position in the at least one array;
  a REPLACE operation that instructs the merge operation to delete data at a specified location of the at least one array and to add a replacement data at the specified location; and
  a MOVE operation to move data of the at least one array at a specified location to a new location of the at least one array.

14. The computer program product claim 13, wherein the MOVE operation inserts a new rank position.

15. The computer program product of claim 13, wherein the REPLACE operation maintains a same rank position for the replacement data.

16. The computer program product of claim 13, wherein in the merge operation, in case of a conflict in data, the last change is used.

17. The computer program product of claim 11, wherein the at least one Changes List specifies an address for an array element comprising a path and a rank.

18. The computer program product of claim 11, wherein the plurality of user devices are in communication with a central processing unit across a network.

19. The computer program product of claim 11, wherein the at least one Changes List comprising only those changes made at a particular user device to a version of the at least one document or the at least one file are sent to a central processing unit for the merge operation and creating of the new version.

20. The computer-implemented method of claim 11, wherein the at least one document or at least one file is a different version of the at least one document or the at least one file at least two of the plurality of user devices thereby permitting different changes to the document or the file by different users concurrently in time.

21. The computer-implemented method of claim 1, wherein the plurality of key/value pairs include a randomly generated identifier, a rank to identify a position in the at least one array, and an original value for an element of the at least one array.

22. The computer-implemented method of claim 11, wherein the plurality of key/value pairs include a randomly generated identifier, a rank to identify a position in the at least one array, and an original value for an element of the at least one array.

23. The computer-implemented method of claim 1, wherein the value is added to the end of a list whenever the specified rank position exceeds the number of elements of the list.

24. The computer-implemented method of claim 11, wherein the value is added to the end of a list whenever the specified rank position exceeds the number of elements of the list.

* * * * *